April 13, 1937. C. R. WASEIGE 2,077,292
CENTRIFUGAL CLUTCH
Filed June 7, 1935
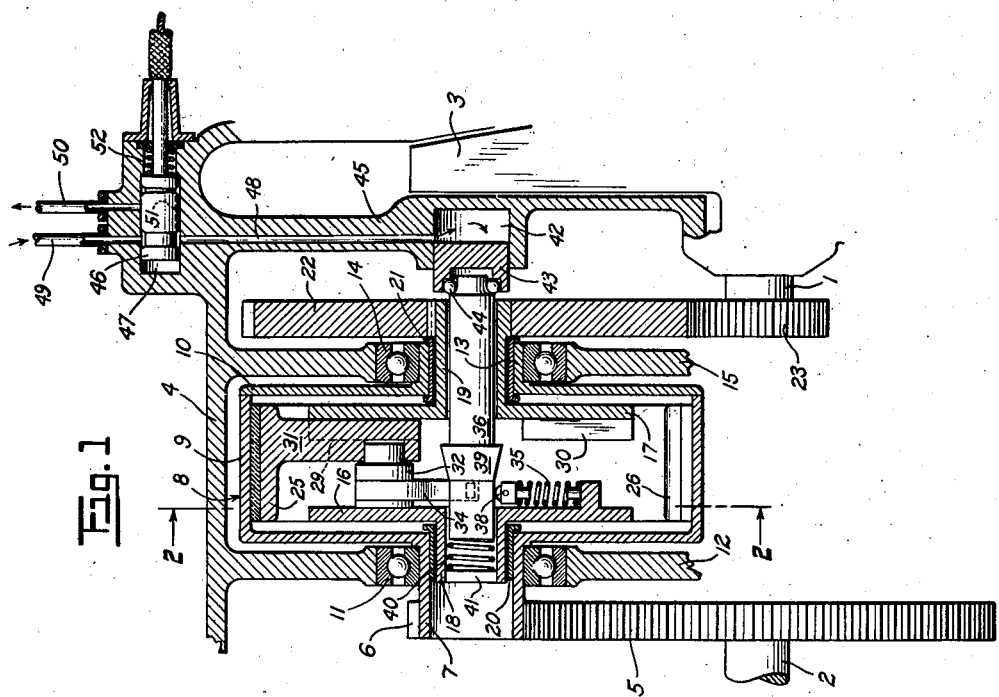
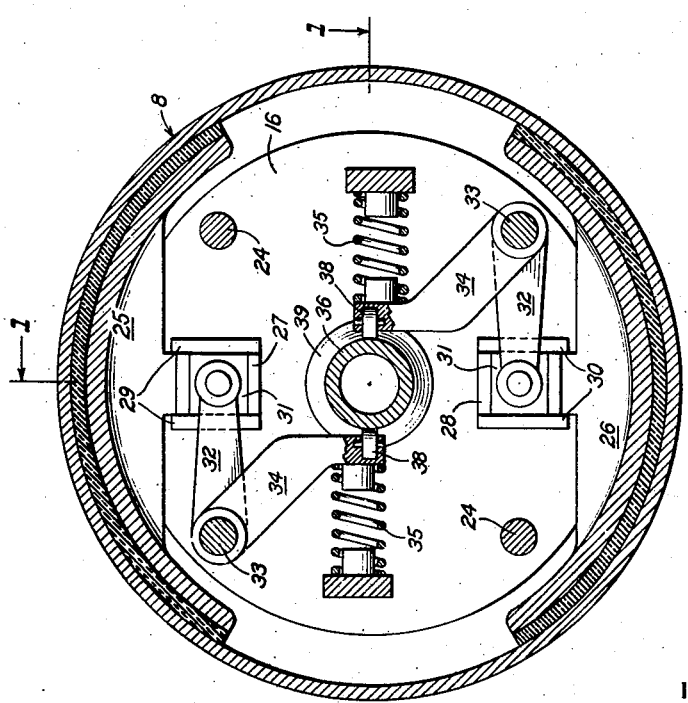
INVENTOR.
Charles Raymond Waseige
BY M:Conkey & Smith
ATTORNEY.

Patented Apr. 13, 1937

2,077,292

UNITED STATES PATENT OFFICE 2,077,292

CENTRIFUGAL CLUTCH

Charles Raymond Waseige, Rueil, France, assignor to Eclipse Aviation Corporation, East Orange, N. J., a corporation of New Jersey Application June 7, 1935, Serial No. 25,493

2 Claims. (Cl. 192—103)

This invention relates to centrifugal friction clutches in general and more particularly to centrifugal friction clutches used in connection with internal combustion engines for driving the centrifugal superchargers thereof. It is known that centrifugal blowers of this type are driven by the engine through the intermediary of centrifugal clutches which enable the operator to clutch in and declutch the supercharges without slowing down the engine and which permit a certain sliding in the transmission to take place at all speeds eliminating thus the transmission to the blower rotor of angular vibrations of the engine crank shafts.

The object of the present invention is to provide a new and improved construction of such clutch mechanisms permitting the operator either to isolate the blower from the engine, or to clutch the same to a gear drive of a desired ratio.

Another object of the invention is to provide a centrifugal clutch mechanism having radially movable shoes carried by the driven member and forming by themselves the centrifugal responsive masses effective to maintain the mechanism in engagement.

A further object of the invention is to provide a centrifugal clutch mechanism having radially movable shoes carried by the driven member and acting as centrifugal responsive masses to maintain themselves in engagement with the driving member, manual control means being provided to move these shoes toward the central axis of the mechanism into disengaged position.

A still further object of the invention is to provide a centrifugal clutch mechanism having radially movable shoes carried by the driven member and acting as centrifugally responsive masses to maintain themselves in engagement with the driving member, the return movement of the shoes to the inner inoperative position being obtained by a sliding rod or shaft movable axially to and within the clutch mechanism.

With these objects and others in view, which will appear from the following description, this invention resides in the new combination and arrangement of parts, as will be stated hereinafter and more fully pointed out in the claims.

A preferred embodiment of a clutch mechanism according to the invention is illustrated in the accompanying drawing in which:

Fig. 1 is a schematical lateral view partly in section of a clutch mechanism according to the invention;

Fig. 2 is a radial sectional view of the clutch mechanism forming a part of the driving connection of a centrifugal compressor.

In the embodiment shown in Figures 1 and 2, the clutch is intended to permit clutching in of the shaft 1 of the compressor on the driving shaft 2, one of the compressor blades being shown in 3. The driving shaft 2 journalled in any suitable manner in the casing 4 is drivably connected by means of a toothed wheel 5 with a gear 6 provided at the extremity of a hub 7 integral with a drum 8 which may be formed of two parts 9, 10, held or secured together in any suitable manner. The hub 7 is journalled by means of a roller bearing 11 in a casing partition 12. Another bearing hub 13 provided on the opposite side of the drum 8 is also journalled by a roller bearing 14 in a casing wall 15.

Inside the drum 8 are housed two flanges or disks 16, 17, spaced apart and provided respectively with cylindrical extensions or hub like parts 18, 19, by means of which said disks are journalled in the hub members 7 and 13 of the drum 8 by means of antifriction bushings 20, 21. The hub member 19 of the disk 17 carries fixed thereon or made integral therewith a toothed wheel 22 meshing with a pinion 23 keyed or otherwise secured on the compressor shaft 1.

In between the two flanges or disks 16, 17 maintained in spaced relation one with respect to the other by spacing bolts 24, are provided two or more diametrically opposite friction members or shoes 25, 26, arranged to slide bodily relative to said disks in opposite radial directions and adapted to rotate therewith.

The radial sliding movement of the shoes 25, 26 is insured by two guiding slots 27, 28 formed between two pairs of parallel projections 29, 30 provided on the inner face of one of the disks 16, 17 and engaging slidably suitable radial tails 31 extending centrally from the shoe members 25, 26.

Rocking levers 32 pivoted on diametrically opposite axes 33 extending between two disks 16, 17 parallelly to the axis of rotation of the drum 8 are connected to the tails 31 of the shoes 25, 26. Each of the levers 32 has two arms, one of which is pivotally connected with the tail of the respective shoe and the other 34 is adapted to bear at its extremity, under the action of a spring 35 interposed between a fixed point and said extremity, against a central rod or shaft 36 extending through the hub members 18, 19 of the disks 16, 17.

The diametrically opposite springs 35 act on the extremities of the control lever arms 34 so as to urge the levers and hence the friction shoes 25, 26 toward their coupling position. These extremities of the control lever arms 34 carry fixed thereon in any suitable manner rollers 38 mounted to rotate about the axes parallel to the central axis of the guiding slots 27, 28.

The shaft or rod 36 is displaceable axially to the drum 8 and is provided with a tapered portion 39 adapted to engage the rollers 38 at the extremities of the lever arms 34 to spread these arms apart against the action of the retaining springs 35 to disengage the friction shoes 25, 26 from the drum 8. A compression spring 40 inserted between the end of the shaft 36 and a bearing plate 41 closing the open extremity of the hub member 18 of disk 16 is provided to yieldingly maintain the shaft during normal operation in a position wherein the shoes 25 and 26 are in engagement with the drum 8 and the rollers 38 are slightly spaced from the cylindrical portion of the shaft 36.

The displacement of the shaft 36 in the opposite direction to disengage the clutch may be produced in any suitable manner and preferably by a hydraulic remote control arrangement including a cylinder 42 and a piston 43, the latter actuating the control shaft 36 by means of a ball thrust bearing 44 of reduced diameter avoiding too great speeds. As shown in Figure 1, the cylinder 42 is formed in the casing wall 45 and the supply of oil or any other suitable fluid is controlled by means of a valve mechanism adapted to put the cylinder in communication either with a fluid pressure supply or a discharged passage.

As shown in Figure 1, the valve mechanism is formed by a plunger 46 sliding within a cylindrical bore 47 communicating respectively with a passage 48 leading to the control cylinder 42, a passage 49 leading to the fluid pressure source and a relief passage 50.

The valve plunger 46 is provided with two circular grooves connected by a longitudinal passage 51 on the periphery thereof, these circular grooves being adapted to register alternatively with the two passages 49 and 50 connected respectively with a source of pressure and a fluid supply reservoir (not shown). The valve plunger 46 is yieldingly maintained during normal operation in a position wherein the cylinder 42 is connected with the relief passage 50 by means of a compression spring 52, and is operable in the opposite direction by the operator through the intermediary of a Bowden wire or a similar control means connected to said plunger. In the embodiment shown in the drawing, the entire valve mechanism is arranged wholly in the supercharger casing 4.

The operation is as follows: When the compressor is disconnected from the engine, the shaft 36 is held in its extreme left position against the spring 40 by the fluid pressure acting on the piston 43 and the rocking levers 32 maintain the friction shoes 25, 26 out of engagement with the drum 8, so that the shoes are not dragged along by said drum. To clutch in, one has to release the fluid pressure on the piston 43 whereby the shaft 36 will be moved by the spring 40 to the right and will permit the rocking levers 32 to rotate under the action of springs 35 to bring the friction shoes 25, 26 into a slight engagement with the drum 8, the motion of which starts then to be transmitted to the friction shoes and hence to the supporting disks thereof 16, 17 and by the gears 22, 23 to the compressor.

Under the action of the centrifugal force acting on the masses of the friction shoes 25, 26 upon rotation, the same are forced into a firm engagement with the driving drum 8, the pressure with which the shoes are applied against the drum being proportional to the square of the velocity of these parts, therefore also of the disks 16, 17 and the shaft 1 of the compressor to which the motion is transmitted by the hub 19, the toothed wheel 22 and the pinion 23.

To declutch the compressor, it is necessary to operate the valve plunger 46 to put the cylinder 42 in communication with the source of fluid pressure whereby the shaft 36 will be pushed to the left and by its tapered portion will engage the rollers on the rocking lever arms 34 to force the friction shoes out of engagement with the drum 8 against the centrifugal force thereof, thus isolating the compressor from the engine.

Although only one embodiment of the invention has been illustrated and described, different changes and modifications which will now appear to those skilled in the art may be made without departing from the scope of the invention. Reference is therefore to be had to the appended claims for a definition of the limits of the invention.

What I claim is:

1. A centrifugal friction clutch comprising in combination a driving cylindrical drum rotatable about its own axis, a driven member within the drum having a plurality of pairs of spaced flanges thereon, each pair of flanges being parallel with respect to each other and to the diameter of the drum, friction shoes located within said drum and adapted to engage the cylindrical wall of said drum, said shoes having portions slidably engaging said flanges, double arm levers pivotally mounted on said driven member, one arm of each lever being operatively connected to a friction shoe in a manner to move the shoe radially of the drum, the other arm of each of said levers being arranged adjacent the axis of the drum, spring means for rocking said levers in a manner to cause the shoes to engage the drum, and an axially movable shaft having a tapered portion for engaging the arms of the levers to disengage the shoes from the drum.

2. A centrifugal friction clutch comprising in combination a driving cylindrical drum rotatable about its own axis, a driven member within the drum having a plurality of pairs of spaced flanges thereon, each pair of flanges being parallel with respect to each other and to the diameter of the drum, friction shoes located within said drum and adapted to engage the cylindrical wall of said drum, said shoes having portions slidably engaging said flanges, double arm levers pivotally mounted on said driven member, one arm of each lever being operatively connected to a friction shoe in a manner to move the shoe radially of the drum, the other arm of each of said levers being arranged adjacent the axis of the drum, spring means for rocking said levers in a manner to cause the shoes to engage the drum, an axially movable shaft having a tapered portion for engaging the arms of the levers to disengage the shoes from the drum, spring means urging the shaft out of contact with the lever arms, and manually controlled means for moving the shaft into contact with the lever arms.

CHARLES RAYMOND WASEIGE.